United States Patent
Murata et al.

(10) Patent No.: US 7,611,793 B2
(45) Date of Patent: Nov. 3, 2009

(54) FUEL CELL SYSTEM, HYDROGEN GAS SUPPLY UNIT, AND METHOD OF CONTROLLING FUEL CELL SYSTEM

(75) Inventors: Shigeaki Murata, Numazu (JP); Shimpei Miura, Mishima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 646 days.

(21) Appl. No.: 10/676,129

(22) Filed: Oct. 2, 2003

(65) Prior Publication Data
US 2004/0072051 A1   Apr. 15, 2004

(30) Foreign Application Priority Data
Oct. 11, 2002   (JP)   ............... 2002-298497

(51) Int. Cl.
*H01M 8/04*   (2006.01)
(52) U.S. Cl. .......................... 429/34; 429/38
(58) Field of Classification Search ........... None
See application file for complete search history.

(56) References Cited

U.S. PATENT DOCUMENTS 6,294,276 B1   9/2001   Ogino

2002/0090329 A1 *   7/2002   Ternan ................. 422/198
2004/0013917 A1 *   1/2004   Ukai et al. .............. 429/19

FOREIGN PATENT DOCUMENTS

| AT | 407 100 B | | 8/1999 |
|---|---|---|---|
| DE | 101 15 220 A1 | | 3/2001 |
| DE | 102 97 729 T5 | | 7/2005 |
| JP | 2-029701 | * | 1/2002 |
| JP | A 2002-29701 | | 1/2002 |
| JP | 2003-24776 | * | 1/2003 |
| WO | WO 03/099421 A1 | | 12/2003 |

* cited by examiner

*Primary Examiner*—John S Maples
(74) *Attorney, Agent, or Firm*—Oliff & Berridge, PLC (57) ABSTRACT

A fuel cell system includes a hydrogen gas supply portion for supplying a fuel cell with hydrogen gas. The hydrogen gas supply portion includes an odorant treatment portion for treating an odorant in a mixed gas containing given hydrogen gas and the odorant. The odorant treatment portion includes an odorant removal portion and an air blower. The odorant removal portion contains a porous adsorbent for adsorbing the odorant contained in the mixed gas and a catalyst for promoting decomposition of the adsorbed odorant. The air blower decomposes the adsorbed odorant. Thus, the odorant treatment portion can perform a function of supplying the fuel cell with hydrogen gas by adsorbing the odorant contained in the mixed gas, and a function of recovering its adsorption capacity by decomposing the adsorbed odorant.

17 Claims, 4 Drawing Sheets

FUEL CELL SYSTEM, HYDROGEN GAS SUPPLY UNIT, AND METHOD OF CONTROLLING FUEL CELL SYSTEM

INCORPORATION BY REFERENCE

The disclosure of Japanese Patent Application No. 2002-298497 filed on Oct. 11, 2002, including the specification, drawings, and abstract is incorporated herein by reference in its entirety.

BACKGROUND OF THE INVENTION

1. Field of the Invention

The invention relates to a hydrogen gas supply unit and, more particularly, to an art of removing an odorant from a mixed gas containing hydrogen gas and the odorant.

2. Description of the Related Art

A fuel cell system includes a fuel cell, a fuel gas supply portion, and an oxidative gas supply portion. The fuel cell generates electricity by means of hydrogen gas contained in a fuel gas supplied from the fuel gas supply portion and oxygen gas contained in an oxidative gas (air) supplied from the oxidative gas supply portion.

In the fuel cell system, a mixed gas containing hydrogen gas and an odorant is utilized for the purpose of detecting leakage of hydrogen gas at an early stage. In many cases, however, the odorant deteriorates output characteristics of the fuel cell. Therefore, the fuel gas supply portion is generally provided with an odorant removal portion for removing the odorant from the mixed gas by adsorbing the odorant. A fuel cell system as mentioned herein is disclosed, for example, in Japanese Patent Application Laid-Open No. 2002-29701.

There is a limit to the amount of the odorant that can be adsorbed by the odorant removal portion. The speed at which the odorant removal portion adsorbs the odorant decreases as the amount of the adsorbed odorant increases. Thus, if the amount of the odorant increases, the odorant removal portion deteriorates in adsorption capacity (e.g., adsorption speed). In the fuel cell system of the related art, therefore, the odorant removal portion needs to be replaced with another one. This problem develops not only in a fuel cell system but also in a hydrogen gas supply unit for supplying a predetermined apparatus with hydrogen gas by removing an odorant from a mixed gas containing hydrogen gas and the odorant.

SUMMARY OF THE INVENTION

The invention has been made to solve the aforementioned problem. It is an object of the invention to provide an art which makes it possible to omit replacement of an odorant removal portion for removing an odorant contained in a mixed gas.

In order to at least partially solve the aforementioned problem, a fuel cell system in accordance with a first aspect of the invention comprises a fuel cell and a hydrogen gas supply portion for supplying the fuel cell with hydrogen gas. The hydrogen gas supply portion is provided with an odorant treatment portion which treats an odorant in a mixed gas containing hydrogen gas and the odorant. The odorant treatment portion has a function of supplying the fuel cell with hydrogen gas by capturing the odorant in the mixed gas and a function of recovering its capturing capacity by decomposing the captured odorant.

The odorant treatment portion may capture the odorant either through absorption. It is to be noted herein that absorption means a phenomenon of penetration of gas molecules into a solid, and/or a phenomenon of residence of gas molecules in the vicinity of a surface of a liquid or a solid. In particular, a phenomenon of absorption of gas molecules into a solid is referred to as occlusion.

As an amount of the odorant captured by the odorant removal portion increases, the capturing capacity thereof deteriorates. According to the first aspect, the odorant treatment portion has the function of recovering the capturing capacity. Therefore, the capturing capacity that has temporarily deteriorated can be recovered, and replacement of the odorant treatment portion can be omitted.

The odorant treatment portion may adsorb the odorant either through physical adsorption or chemical adsorption. It is to be noted herein that physical adsorption means adsorption resulting from a Van der Waals force, and that chemical adsorption means adsorption resulting from chemical bonding.

In the aforementioned first aspect, the odorant treatment portion may include an odorant removal portion containing a porous adsorbent for adsorbing the odorant contained in the mixed gas and a catalyst for promoting decomposition of the adsorbed odorant, and a decomposition support portion which decomposes the odorant adsorbed in the porous adsorbent. In this construction, the odorant contained in the mixed gas can be adsorbed through physical adsorption, and the adsorbed odorant can be decomposed swiftly.

The adsorbent may contain activated carbon or zeolite. The catalyst may contain a noble metal catalyst.

Furthermore, the decomposition support portion may include an oxygen gas supply portion which supplies the odorant removal portion with oxygen gas. The odorant removal portion may be designed to oxidize and decompose the adsorbed odorant by means of oxygen gas, by selectively introducing an oxidative gas into the odorant removal portion.

The decomposition support portion may include a heating portion which heats the odorant removal portion. The adsorbed odorant may be reduced and decomposed by means of hydrogen gas contained in the mixed gas to be supplied, by heating the odorant removal portion by means of the heating portion.

In this construction, the capturing capacity can be recovered by reducing the adsorbed odorant.

The odorant treatment portion may further be designed to prevent post-decomposition gases discharged from the odorant removal portion from being supplied to the fuel cell during decomposition of the adsorbed odorant, and to allow the post-decomposition gases to be discharged to the outside. This construction makes it possible to prevent output characteristics of the fuel cell from deteriorating due to the post-decomposition gases.

A hydrogen gas supply unit in accordance with a second aspect of the invention comprises an odorant treatment portion which treatds an odorant in a mixed gas containing hydrogen gas and the odorant. The odorant treatment portion has a function of supplying a predetermined apparatus with hydrogen gas by capturing the odorant contained in the mixed gas and a function of recovering the capturing capacity by decomposing the captured odorant.

In the second aspect as well, the odorant treatment portion has the function of recovering the capturing capacity. Therefore, even if the capturing capacity has deteriorated through an increase in amount of the captured odorant, the capturing capacity can be recovered, and replacement of the odorant treatment portion can be omitted.

A method of controlling a fuel cell system in accordance with a third aspect of the invention comprises three steps. In the first step, an odorant removal portion is supplied with a mixed gas containing hydrogen gas and an odorant, the odorant removal portion captures the odorant contained in the mixed gas, and the fuel cell is supplied with the remaining hydrogen gas. In the second step, it is determined whether or not an estimated amount of the odorant captured by the odorant removal portion is equal to or larger than a predetermined amount. In the third step, the odorant captured by the odorant removal portion is decomposed if it is determined that the estimated amount of the captured odorant is equal to or larger than the predetermined amount.

It is to be noted herein that the invention can be implemented in various modes including a hydrogen gas supply unit, a fuel cell system equipped with the hydrogen gas supply unit, a moving object or the like mounted with the fuel cell system, and the like.

DETAILED DESCRIPTION OF THE PREFERRED EMBODIMENTS

A. First Embodiment

Figure 1:
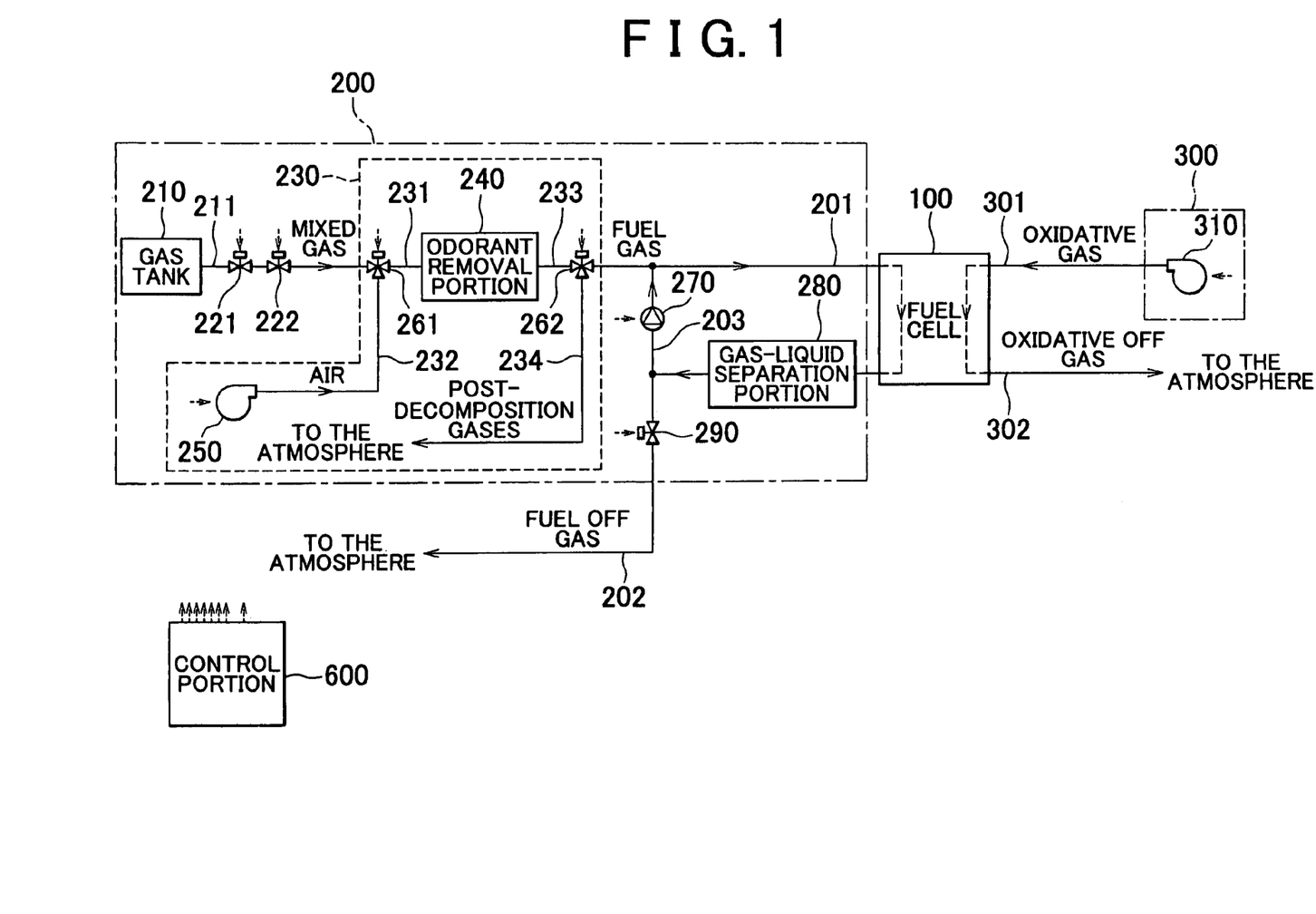
FIG. 1 is an explanatory view showing an overall construction of a fuel cell system in accordance with a first embodiment of the invention.

A-1. Overall Construction of Fuel Cell System:

Next, modes of implementing the invention will be described on the basis of embodiments thereof. FIG. 1 is an explanatory view showing an overall construction of a fuel cell system in accordance with the first embodiment of the invention. This fuel cell system is installed in a vehicle.

As shown in FIG. 1, the fuel cell system includes a fuel cell 100, a fuel gas supply portion 200 which supplies the fuel cell with a fuel gas containing hydrogen gas, an oxidative gas supply portion 300 which supplies the fuel cell with an oxidative gas (air) containing oxygen gas, and a control portion 600 which controls operations of the respective portions. A fuel gas passage 201 through which the fuel gas supplied from the fuel gas supply portion 200 flows and a fuel off gas passage 202 through which a spent fuel off gas flows are connected to the fuel cell 100. An oxidative gas passage through which the oxidative gas supplied from the oxidative gas supply portion 300 flows and an oxidative off gas passage 302 through which a spent oxidative off gas flows are connected to the fuel cell 100.

The fuel gas supply portion 200 includes a gas tank 210 for storing a mixed gas containing hydrogen gas and an odorant, and an odorant treatment portion 230 which treats the odorant contained in the mixed gas. A mixed gas passage 211 is provided between the gas tank 210 and the odorant treatment portion 230. The mixed gas passage 211 is provided with a pressure reducing valve 221 and a flow control valve 222. The mixed gas is stored at a relatively high pressure in the gas tank 210. The pressure reducing valve 221 reduces a pressure of the mixed gas supplied from the gas tank 210 to a predetermined pressure. The flow control valve 222 adjusts a flow rate of the mixed gas and supplies it to the odorant treatment portion 230. The odorant treatment portion 230 removes the odorant from the mixed gas and thus can supply hydrogen gas containing almost no odorant to the fuel cell 100 via the fuel gas passage 201. The odorant treatment portion 230 will be described later.

The fuel gas supply portion 200 further includes a circulation passage 203 for connecting the fuel off gas passage 202 to the fuel gas passage 201, a circulating pump 270, a gas-liquid separation portion 280, and a shut-off valve 290. The fuel off gas passage 202 is provided with the gas-liquid separation portion 280 and the shut-off valve 290. The circulation passage 203 is provided with the circulating pump 270. The circulating pump 270 has a function of returning a fuel off gas containing a relatively low concentration of hydrogen into the fuel gas passage 201 as a fuel gas. Because of this construction, the fuel gas circulates through an annular passage between the circulating pump 270 and the fuel cell 100. A flow rate (mol/sec) of the hydrogen gas supplied into the fuel cell 100 per unit time can be increased by thus causing the fuel gas to circulate. As a result, a reaction efficiency in the fuel cell 100 can be enhanced. However, as an electrochemical reaction in the fuel cell 100 progresses, the amount of hydrogen gas (mol) contained in the fuel gas in the annular passage decreases. Nitrogen gas, water vapor (water product) and the like contained in the oxidative gas in a cathode (oxygen pole)-side passage enter the fuel gas in an anode (hydrogen pole)-side passage via an electrolyte membrane in the fuel cell 100. Thus, the concentration (volume percentage) of hydrogen gas contained in the fuel gas gradually decreases. In the first embodiment, therefore, the flow control valve 222 and the shut-off valve 290 are so set as to be opened intermittently. Thus, while a fuel gas containing a high concentration of hydrogen gas is supplied to the fuel cell 100, a fuel off gas containing a low concentration of hydrogen gas is discharged therefrom. A spent fuel off gas is discharged to the atmosphere via the fuel off gas passage 202. The gas-liquid separation portion 280 has a function of removing excessive water vapor from the fuel off gas.

The oxidative gas supply portion 300 includes an air blower 310. The oxidative gas supply portion 300 supplies an oxidative gas (air) containing oxygen gas to the fuel cell 100 via the oxidative gas passage 301. A spent oxidative off gas is discharged to the atmosphere via the oxidative off gas passage 302.

The fuel cell 100 generates electricity by means of hydrogen gas contained in the fuel gas supplied from the fuel gas supply portion 200 and oxygen gas contained in the oxidative gas (air) supplied from the oxidative gas supply portion 300. The fuel cell 100 of the first embodiment is a polymer electrolyte fuel cell, which is relatively small in size and exhibits high efficiency in generating electricity.

The control portion 600 controls operation of the entire fuel cell system. In particular, the control portion 600 can control treatment of the odorant in the odorant treatment portion by controlling the odorant treatment portion 230. It will be described later in more detail how the control portion 600 controls the odorant treatment portion 230.

A-2. Construction of Odorant Treatment Portion:

In the fuel cell system of the first embodiment, t-butyl mercaptan (TBM) is used as the odorant. In the case where an odorant containing sulfur such as TBM or the like is supplied to the fuel cell 100, a catalyst provided in each of electrodes of the fuel cell is poisoned. As a result, output characteristics of the fuel cell deteriorate. In the fuel cell system of the first embodiment, therefore, the odorant treatment portion 230 that can remove the odorant from the mixed gas is provided upstream of the fuel cell 100, as is apparent from FIG. 1.

Instead of TBM, tetrahydrothiophene(THT), dimethyl sulfide (DMS), methyl mercaptan, ethyl mercaptan or the like can be used as the odorant containing sulfur.

As described above, the fuel cell system of the related art employs the odorant removal portion having only a function of adsorbing and removing an odorant. However, there is a limit to the amount of the odorant that can be adsorbed by the odorant removal portion. The speed at which the odorant removal portion adsorbs the odorant decreases as the amount of the adsorbed odorant increases. In the fuel cell system of the related art, therefore, the odorant removal portion needs to be replaced with another one. In the first embodiment, replacement of the odorant treatment portion can be omitted by contriving the construction of the odorant treatment portion 230.

As shown in FIG. 1, the odorant treatment portion 230 includes an odorant removal portion 240, an air blower 250 for supplying air to the odorant removal portion, and two three-way valves 261 and 262 provided upstream and downstream of the odorant removal portion respectively. The air blower 250 shown in FIG. 1 is an example of the decomposition support portion of the invention. The first and second three-way valves 261 and 262 are examples of the first and second flow path switching portions of the invention respectively.

The mixed gas passage 211 leading to the gas tank 210 is connected to a first port of the first three-way valve 261. An air passage 232 leading to the air blower 250 is connected to a second port of the first three-way valve 261. A selected gas passage 231 leading to the odorant removal portion 240 is connected to a third port of the first three-way valve 261. A treated gas passage 233 leading to the odorant removal portion 240 is connected to a first port of the second three-way valve 262. The fuel gas passage 201 leading to the fuel cell 100 is connected to a second port of the second three-way valve 262. A post-decomposition gas passage 234 open to the atmosphere is connected to a third portion of the second three-way valve 262.

The mixed gas flowing from the gas tank 210 and air flowing from the air blower 250 are selectively introduced into the odorant removal portion 240 by the first three-way valve 261. More specifically, in the case where the three-way valve 261 is set such that the mixed gas passage 211 communicates with the selected gas passage 231, the mixed gas is supplied to the odorant removal portion 240. On the other hand, in the case where the three-way valve 261 is set such that the air passage 232 communicates with the selected gas passage 231, air is supplied to the odorant removal portion 240.

If the mixed gas is supplied to the odorant removal portion 240, the odorant removal portion 240 adsorbs the odorant contained in the mixed gas, whereby the odorant can be removed from the mixed gas. At this moment, hydrogen gas into which almost no odorant has been mixed is discharged from the odorant removal portion 240. On the other hand, if air is supplied to the odorant removal portion 240, the odorant removal portion 240 can recover its adsorption capacity by decomposing the adsorbed odorant by means of oxygen gas contained in air. At this moment, post-decomposition gases into which the adsorbed odorant is decomposed are discharged from the odorant removal portion 240. The hydrogen gas discharged from the odorant removal portion 240 and the post-decomposition gases discharged from the odorant removal portion 240 are respectively introduced into the fuel cell 100 and the post-decomposition gas passage 234 by the second three-way valve 262. More specifically, in the case where hydrogen gas is introduced into the fuel cell 100, the second three-way valve 262 is set such that the treated gas passage 233 communicates with the fuel gas passage 201. On the other hand, in the case where post-decomposition gases are introduced into the post-decomposition gas passage 234, the second three-way valve 262 is set such that the treated gas passage 233 communicates with the post-decomposition gas passage 234. Thus, the post-decomposition gases can be prevented from being supplied to the fuel cell. As a result, the output characteristics of the fuel cell can be prevented from deteriorating due to the post-decomposition gases.

Figure 2:
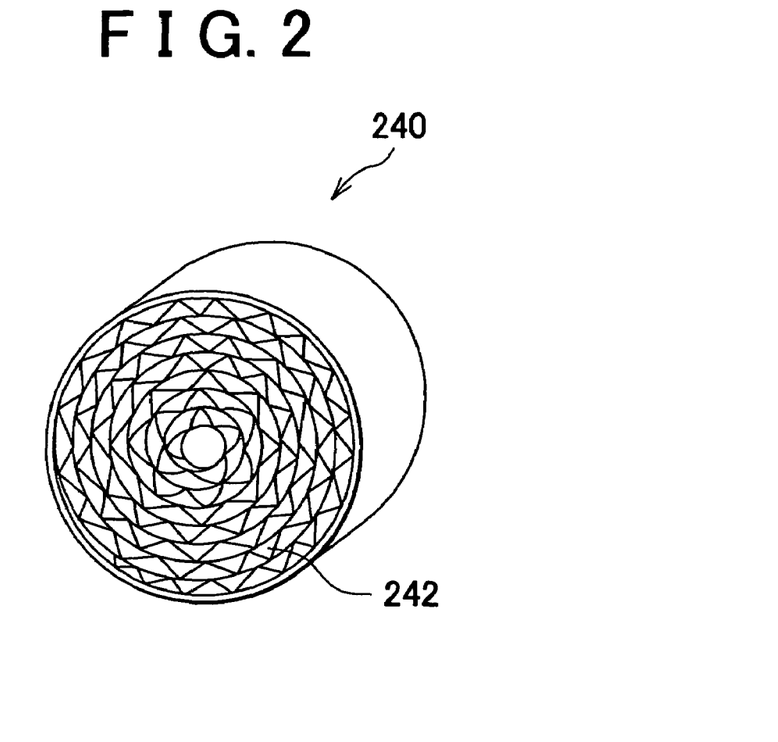
FIG. 2 is an explanatory view schematically showing an internal construction of an odorant removal portion shown in FIG. 1.

FIG. 2 is an explanatory view schematically showing an internal construction of the odorant removal portion 240 shown in FIG. 1. The odorant removal portion 240 includes a carrier 242 having a plurality of corrugated small passages. An adsorbent and a catalyst are carried on the carrier 242.

Figure 3:
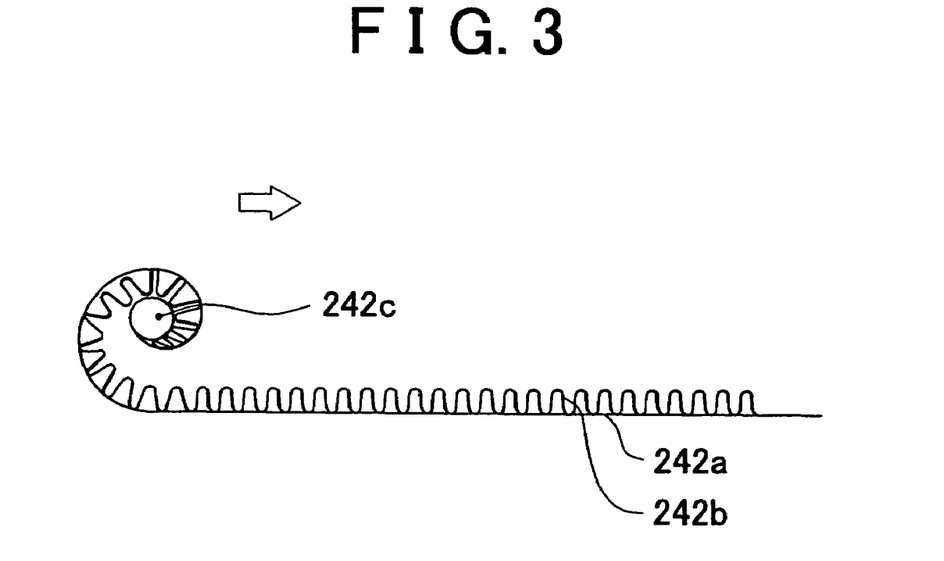
FIG. 3 is an explanatory view showing a method of manufacturing the odorant removal portion shown in FIG. 2.

FIG. 3 is an explanatory view showing a method of manufacturing the odorant removal portion 240 shown in FIG. 2. As shown in FIG. 3, the carrier 242 is formed of a sheet composed of a flat plate 242a and a corrugated plate 242b. The sheet is joined at one end thereof to an axial member 242c. Then, the sheet is spirally wound around the axial member 242c, which serves as a core. That is, as shown in FIG. 2, the carrier 242 has a roll structure in which the flat plate 242a and the corrugated plate 242b are alternately wound around the axial member 242c. The distance between adjacent portions of the flat plate 242a is held substantially constant by the corrugated plate 242b. Formed between the flat plate 242a and the corrugated plate 242b are a plurality of corrugated small passages, which extend along an axial direction of the axial member 242c. After the carrier 242 has been prepared, the adsorbent and the catalyst are carried on the carrier 242. For instance, the carrier 242 is soaked in a solution of the adsorbent and in a solution of the catalyst and then is heated, whereby the adsorbent and the catalyst are fixed onto the carrier 242.

A metal material such as stainless steel or the like can be used as the flat plate 242a and the corrugated plate 242b. A porous material such as activated carbon, zeolite or the like can be used as the adsorbent. A noble metal catalyst such as Pt, Pd, Ru or the like can be used as the catalyst. Although the carrier 242 has a roll structure in the first embodiment, the carrier 242 may have a honeycomb structure instead.

As described above, the odorant removal portion 240 contains the adsorbent. Therefore, the adsorbent adsorbs the odorant in the mixed gas containing hydrogen gas and the odorant, whereby it becomes possible to remove the odorant from the mixed gas. The odorant is physically adsorbed into micropores of the adsorbent. Because the odorant removal portion 240 contains the noble metal catalyst, decomposition of the adsorbed odorant can be promoted by means of oxygen gas contained in supplied air. The odorant that has been physically adsorbed is oxidized (burnt) by an oxidative gas. As a result, postdecomposition gases containing $H_2O$, $CO_2$ and $SO_2$ are produced.

Thus, the odorant treatment portion 230 of the first embodiment can decompose the adsorbed odorant and therefore can recover its adsorption capacity, which deteriorates as the amount of the adsorbed odorant increases. As a result, replacement of the odorant treatment portion can be omitted.

The control portion 600 (FIG. 1) has two control modes for controlling the odorant treatment portion 230. That is, the control portion 600 performs the first control mode in causing the odorant removal portion 240 to adsorb the odorant contained in the mixed gas, and performs the second control mode in recovering the adsorption capacity of the odorant removal portion 240. In the first control mode, the control portion 600 controls the first three-way valve 261 to introduce the mixed gas into the odorant removal portion 240, and controls the second three-way valve 262 to introduce hydrogen gas discharged from the odorant removal portion 240 into the fuel cell 100. On the other hand, in the second control mode, the control portion 600 controls the air blower 250 and the first three-way valve 261 to supply air to the odorant removal portion 240, and controls the second three-way valve 262 to introduce post-decomposition gases discharged from the odorant removal portion 240 into the post-decomposition gas passage 234.

In the first embodiment, the first control mode is constantly performed during an operation period (a power generation period) of the fuel cell system. On the other hand, the second control mode is performed during an operation stoppage period (a power generation stoppage period) of the fuel cell system only if a predetermined condition is fulfilled. More specifically, the second control mode is performed if the amount of the odorant adsorbed by the odorant removal portion 240 becomes equal to or larger than a predetermined amount. For instance, the control portion 600 acquires a cumulative power generation amount of the fuel cell 100, and performs the second control mode if the cumulative power generation amount becomes equal to or larger than a predetermined amount. For the second time and thenceforth, the second control mode is performed if a cumulative power generation amount based on the last performance of the second control mode becomes equal to or larger than a predetermined amount. In the first embodiment, the air blower 250, the two three-way valves 261 and 262, and the control portion 600 operate by being supplied with power delivered from a secondary battery (accumulator) (not shown) provided in the fuel cell system. Thus, the second control mode can be performed during the operation stoppage period of the fuel cell system.

In the first embodiment, a timing for performing the second control mode is determined in accordance with a cumulative power generation amount. Instead, however, a timing for performing the second control mode may be determined in accordance with a cumulative flow rate of hydrogen gas supplied to the fuel cell 100, a cumulative flow rate of the mixed gas supplied to the odorant treatment portion 230, or the like. Thus, if a cumulative power generation amount relating to a cumulative flow rate of hydrogen gas, a cumulative flow rate of hydrogen gas, a cumulative flow rate of the mixed gas, or the like is used, an amount of the odorant adsorbed by the odorant removal portion 240 can be estimated easily using a mixing ratio between hydrogen gas and the odorant.

As described hitherto, the fuel cell system of the first embodiment includes the fuel cell 100 and the fuel gas supply portion 200 which supplies hydrogen gas to the fuel cell. The fuel gas supply portion 200 includes the odorant treatment portion 230 which treats the odorant in the mixed gas containing the odorant and the given hydrogen gas. The odorant treatment portion 230 includes the odorant removal portion 240 and the air blower 250. The odorant removal portion 240 contains the porous adsorbent for adsorbing the odorant contained in the mixed gas and the catalyst for promoting decompoesition of the adsorbed odorant. The air blower 250 is provided to decompose the adsorbed odorant. Thus, the odorant treatment portion 230 can perform a function of supplying hydrogen gas to the fuel cell by adsorbing the odorant contained in the mixed gas, and can perform a function of recovering its adsorption capacity by decomposing the adsorbed odorant. If the odorant treatment portion 230 as mentioned herein is adopted, the odorant can be removed from the mixed gas by physical adsorption, and the adsorbed odorant can be decomposed swiftly. As a result, replacement of the odorant treatment portion 230 (more specifically, the odorant removal portion 240) can be omitted. The odorant treatment portion 230 has a function of recovering its adsorption capacity, and therefore is also advantageous in that the odorant removal portion 240 can be set relatively small in volume (size).

In the first embodiment, the second control mode is performed during a period in which the amount of the odorant adsorbed by the odorant removal portion 240 is equal to or larger than the predetermined amount with operation of the fuel cell system being stopped. Instead, however, the second control mode may be performed whenever operation of the fuel cell system is stopped. Thus, the volume (size) of the odorant removal portion can be set much smaller. However, if a timing for performing the second control mode is set as in the first embodiment, the adsorption capacity of the odorant removal portion can be efficiently recovered only when the necessity arises.

B. Second Embodiment

Figure 4:
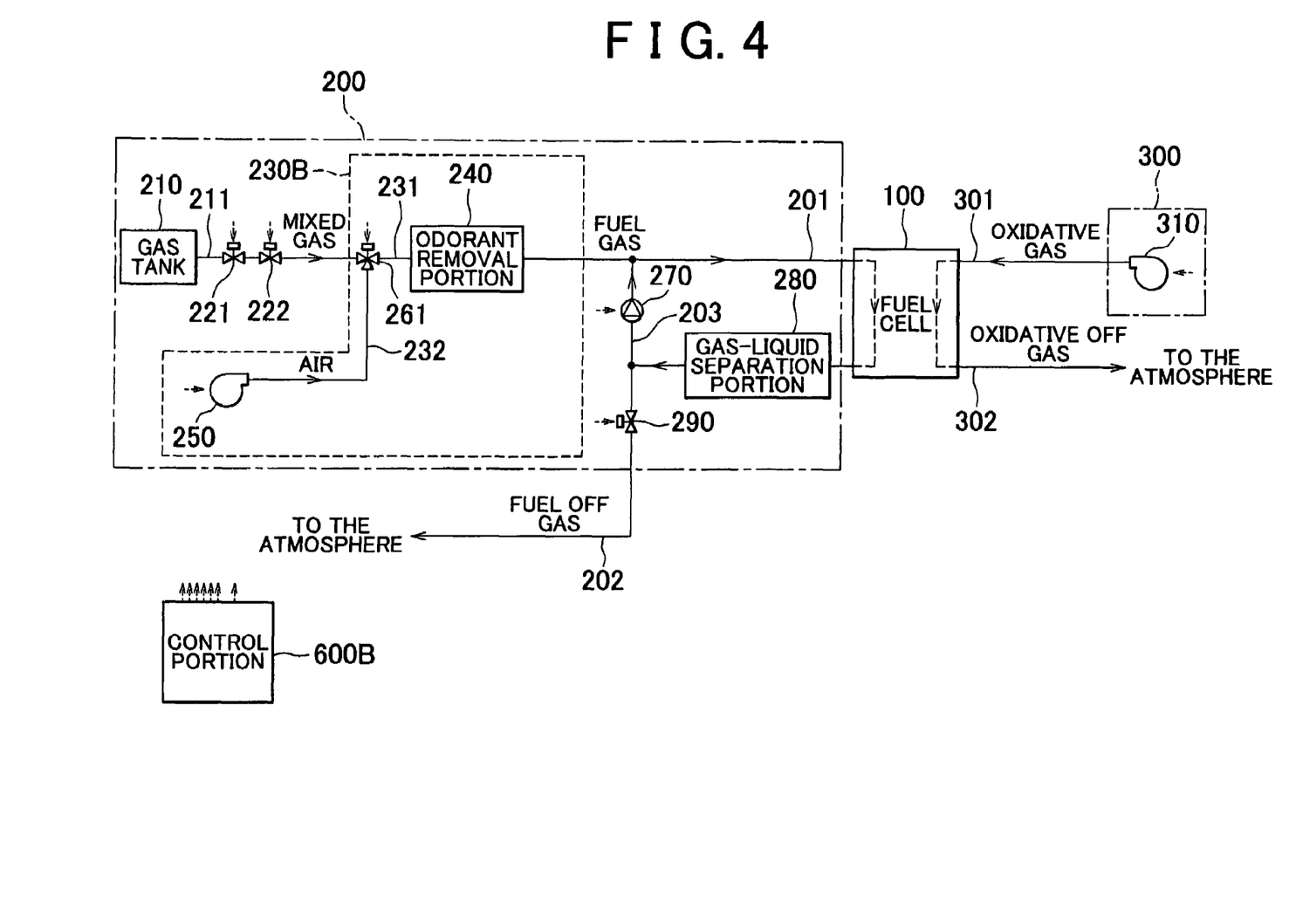
FIG. 4 is an explanatory view showing an overall construction of a fuel cell system in accordance with a second embodiment of the invention.

FIG. 4 is an explanatory view showing an overall construction of the fuel cell system in accordance with the second embodiment of the invention. Although FIG. 4 is substantially identical with FIG. 1, an odorant treatment portion 230B and a control portion 600B have been modified. More specifically, the odorant treatment portion 230B of the second embodiment dispenses with the post-decomposition gas passage 233 and the second three-way valve 262 shown in FIG. 1. This modification results from a change of odorant.

That is, although the odorant containing sulfur is used as the odorant in the first embodiment, an odorant containing no sulfur is used in the second embodiment. More specifically, although this odorant itself adheres to the catalyst provided in each of the electrodes of the fuel cell and deteriorates output characteristics of the fuel cell, post-decomposition gases obtained therefrom hardly deteriorate output characteristics of the fuel cell. As the odorant as mentioned herein, for example, aldehyde, butyric acid (butanoic acid), an acetic ester such as methyl acetate, or the like can be used. Post-decomposition gases produced during decomposition of such an odorant include $CO_2$ and $H_2O$.

As in the first embodiment, the odorant removal portion 240 can remove the odorant from the mixed gas by adsorbing the odorant contained in the mixed gas. The odorant removal portion 240 can recover its adsorption capacity by decomposing the adsorbed odorant by means of oxygen gas contained in air. In performing the first control mode (adsorption of the odorant), the control portion 600B controls the three-way valve 261 to introduce the mixed gas into the odorant removal portion 240. At this moment, hydrogen gas discharged from the odorant removal portion 240 is introduced into the fuel cell 100. On the other hand, in performing the second control mode (recovery of adsorption capacity), the control portion 600B controls the air blower 250 and the three-way valve 261 to supply the odorant removal portion 240 with air. At this moment, the post-decomposition gases discharged from the odorant removal portion 240 are introduced into the fuel cell 100. Although the post-decomposition gases are thus introduced into the fuel cell 100 in the second embodiment, they include no component containing sulfur. Therefore, even in the case where the post-decomposition gases are introduced into the fuel cell 100, output characteristics of the fuel cell hardly deteriorate.

In the second embodiment as well, as in the first embodiment, the first control mode is performed during an operation period (a power generation period) of the fuel cell system, whereas the second control mode is performed during an operation stoppage period (a power generation stoppage period) of the fuel cell system if the estimated amount of the odorant adsorbed by the odorant removal portion 240 becomes equal to or larger than a predetermined amount. In the second embodiment, however, even if the post-decomposition gases have been introduced into the fuel cell, output characteristics of the fuel cell hardly deteriorate. Accordingly, the second control mode may be performed during the operation period (the power generation period) of the fuel cell system if the estimated amount of the odorant adsorbed by the odorant removal portion 240 becomes equal to or larger than the predetermined amount.

In the fuel cell system in accordance with the second embodiment as shown in FIG. 4, the post-decomposition gases are introduced into the fuel cell 100. However, the post-decomposition gases may be introduced into the post-decomposition gas passage 234 by means of the construction of the fuel cell system of the first embodiment (FIG. 1). In other words, the aforementioned odorant containing no sulfur as used in the second embodiment can also be used in the fuel cell system of the first embodiment.

C. Third Embodiment

Figure 5:
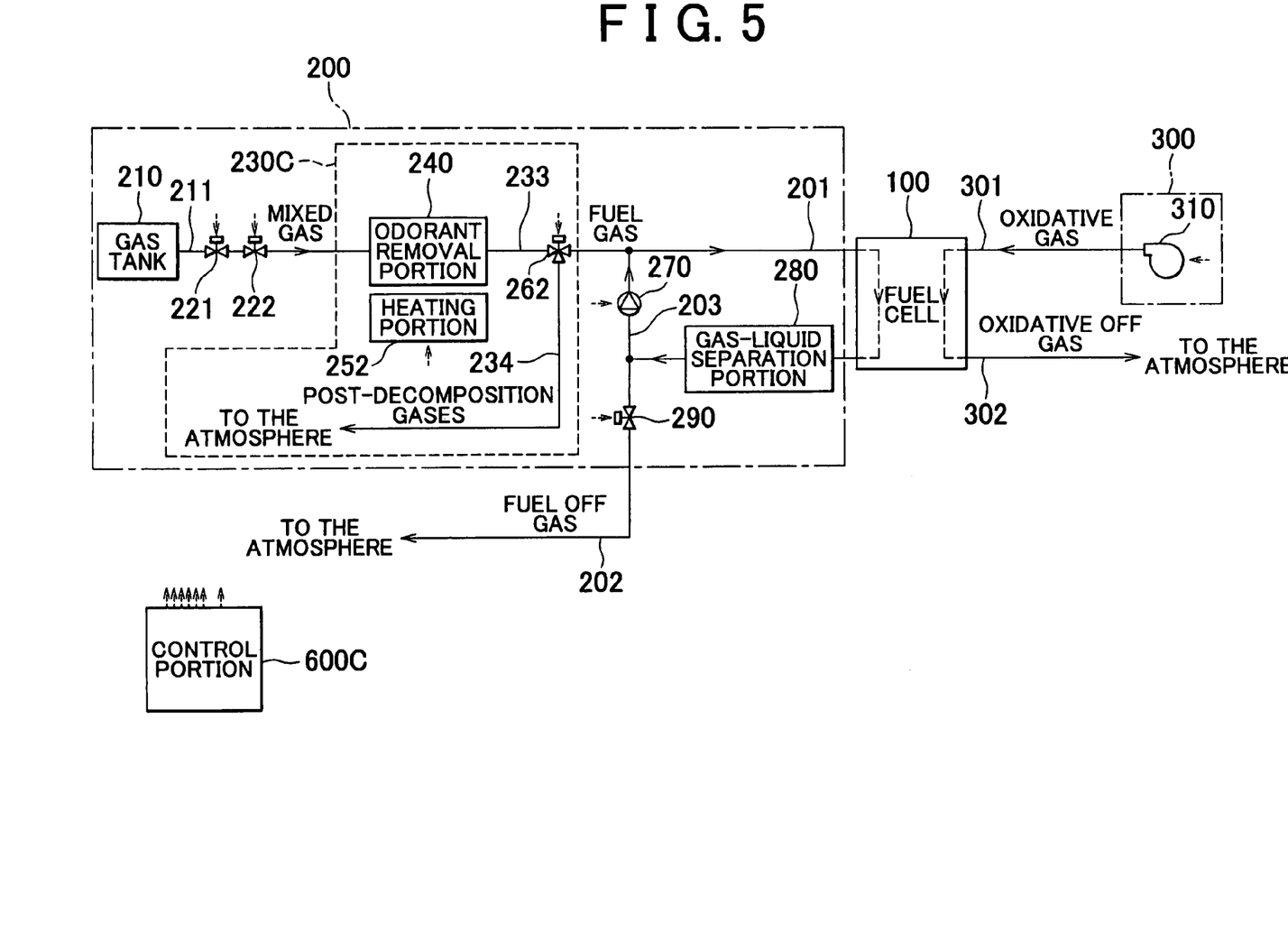
FIG. 5 is an explanatory view showing an overall construction of a fuel cell system in accordance with a third embodiment of the invention.

FIG. 5 is an explanatory view showing an overall construction of the fuel cell system in accordance with the third embodiment of the invention. Although FIG. 5 is substantially identical with FIG. 1, an odorant treatment portion 230C and a control portion 600C have been modified. More specifically, the odorant treatment portion 230C of the third embodiment dispenses with the air blower 250, the air passage 232, and the first three-way valve 261 shown in FIG. 1. Instead, a heating portion 252 is added to the odorant treatment portion 230C. This modification results from a change of odorant.

That is, although the odorant containing sulfur is used in the first embodiment, an odorant containing no sulfur is used in the third embodiment. More specifically, although the odorant itself adheres to the catalyst provided in each of the electrodes of the fuel cell and deteriorates output characteristics of the fuel cell, the third embodiment employs an odorant that can be reduced relatively easily. As the odorant as mentioned herein, for example, aldehyde, butyric acid (butanoic acid), an acetic ester such as methyl acetate, or the like can be used.

The odorant removal portion 240 of the third embodiment can remove the odorant from the mixed gas by adsorbing the odorant contained in the mixed gas. The odorant removal portion 240 can recover its adsorption capacity by decomposing the adsorbed odorant by means of hydrogen gas contained in the mixed gas. However, the odorant removal portion 240 is heated by the heating portion 252 during decomposition of the adsorbed odorant. The heating portion 252 heats the odorant removal portion 240 such that the temperature of the catalyst becomes equal to or higher than an activation temperature. The activation temperature means a temperature where a catalytic reaction progresses in a self-sustaining manner. In the third embodiment, for example, the activation temperature ranges from about 400° C. to about 500° C. Thus, the odorant removal portion 240 is supplied with the mixed gas while being heated, whereby the adsorbed odorant is reduced by hydrogen gas. As a result, post-decomposition gases containing $CH_4$ and $H_2O$ are produced.

In performing the first control mode (adsorption of the odorant), the control portion 600C controls the three-way valve 262 to introduce hydrogen gas discharged from the odorant removal portion 240 into the fuel cell 100. On the other hand, in performing the second control mode (recovery of adsorption capacity), the control portion 600C controls the heating portion 252 to heat the odorant treatment portion 240, and controls the three-way valve 262 to introduce post-decomposition gases discharged from the odorant removal portion 240 into the post-decomposition gas passage 234.

In the third embodiment as well, as in the first embodiment, the first control mode is performed during an operation period (a power generation period) of the fuel cell system, and the second control mode is performed during an operation stoppage period (a power generation stoppage period) of the fuel cell system if the estimated amount of the odorant adsorbed by the odorant removal portion 240 becomes equal to or larger than a predetermined amount.

In the fuel cell system of the third embodiment shown in FIG. 5, post-decomposition gases are introduced into the post-decomposition gas passage 234. However, if the post-decomposition gases hardly deteriorate output characteristics of the fuel cell, they may be introduced into the fuel cell 100 by means of the construction of the fuel cell system of the second embodiment shown in FIG. 4. In this case, the second control mode may be performed during the operation period (the power generation period) of the fuel cell system if the estimated amount of the odorant adsorbed by the odorant removal portion 240 becomes equal to or larger than a predetermined amount.

As described hitherto, in the fuel cell system of the third embodiment, the odorant treatment portion 230C includes the odorant removal portion 240 and the heating portion 252. The odorant removal portion 240 contains a porous adsorbent for adsorbing the odorant contained in the mixed gas and a catalyst for promoting decomposition of the adsorbed odorant. The heating portion 252 decomposes the adsorbed odorant. Thus, the odorant treatment portion 230C can perform a function of supplying the fuel cell with hydrogen gas by adsorbing the odorant contained in the mixed gas, and can perform a function of recovering its adsorption capacity by decomposing the adsorbed odorant. Even in the case where the odorant treatment portion 230C constructed as described above is adopted, the odorant can be removed from the mixed gas through physical adsorption, and the adsorbed odorant can be decomposed swiftly. Hence, replacement of the odorant treatment portion 230C (more specifically, the odorant removal portion 240) can be omitted.

As is apparent from the foregoing description, the heating portion 252 of the third embodiment is an example of the decomposition support portion of the invention. An electric heater, a gas heater or the like can be employed as the heating portion 252. The heating portion 252 may heat the odorant removal portion 240 either indirectly or directly. More specifically, if the carrier 242 is utilized as an electric heater, the odorant removal portion 240 can be heated directly. In this case, it is appropriate that an insulating membrane (oxide film) be formed in advance on a surface of the corrugated plate 242b shown in FIG. 3, and that current be caused to flow between two electrically connected portions, namely, between a central portion of the carrier 242 (the axial member 242c) and an outer surface portion of the carrier 242 (the flat plate 242a).

It is to be noted herein that the invention is not limited to the aforementioned examples or embodiments but can be implemented in various modes without departing from the gist thereof. For example, the following modifications are possible as well.

(1) In the aforementioned embodiments, the odorant treatment portion 230 is provided in the fuel gas passage 201 in a region upstream of the annular passage. Instead, however, the odorant treatment portion 230 may be provided in the fuel gas passage 201 in a region inside the annular passage.

(2) In the aforementioned embodiments, the fuel gas supply portion 200 includes the gas tank 210 for storing the mixed gas containing hydrogen gas and the odorant. Instead, however, the fuel gas supply portion 200 may include a gas tank for storing hydrogen gas and an odorant addition portion for adding an odorant to hydrogen gas discharged from the gas tank so as to produce a mixed gas. In the case where the fuel gas supply portion includes the odorant addition portion, the fuel gas supply portion may contain a hydrogen occlusion alloy or may be provided with a reformation portion which produces hydrogen gas by reforming alcohol, natural gas, gasoline, ether, aldehyde or the like.

In general, it is appropriate that the hydrogen gas supply portion be provided with an odorant treatment portion which treats an odorant in a mixed gas containing given hydrogen gas and the odorant.

(3) In the aforementioned embodiments, the odorant treatment portion 230 includes the odorant removal portion 240 containing the porous adsorbent, and thus adsorbs the odorant contained in the mixed gas through physical adsorption. Instead, however, the odorant treatment portion may adsorb the odorant contained in the mixed gas through chemical adsorption.

In general, it is preferable that the odorant treatment portion capture the odorant contained in the mixed gas through adsorption.

In the aforementioned embodiments, the odorant treatment portion 230 captures the odorant contained in the mixed gas through adsorption. Instead, however, the odorant treatment portion may capture the adsorbent contained in the mixed gas through absorption.

In general, it is appropriate that the odorant treatment portion have a function of supplying the fuel cell with hydrogen gas by capturing the odorant contained in the mixed gas and a function of recovering its adsorption capacity by decomposing the captured odorant.

(4) The aforementioned embodiments deal with cases where the invention is applied to the polymer electrolyte fuel cell. However, the invention is also applicable to fuel cells of other types.

What is claimed is:

1. A fuel cell system comprising:
   a fuel cell; and
   a hydrogen gas supply portion which supplies the fuel cell with hydrogen gas,
      the hydrogen gas supply portion including an odorant treatment portion which treats an odorant in a mixed gas containing the hydrogen gas and the odorant to obtain the hydrogen gas to supply to the fuel cell, wherein the odorant treatment portion includes a carrier that carries a porous adsorbent for adsorbing the odorant contained in the mixed gas and a catalyst for promoting decomposition of the odorant adsorbed by the porous adsorbent.

2. The fuel cell system according to claim 1, wherein the odorant treatment portion further includes a decomposition support portion which decomposes the odorant adsorbed by the porous adsorbent.

3. The fuel cell system according to claim 1, wherein the adsorbent contains activated carbon.

4. The fuel cell system according to claim 1, wherein the adsorbent contains zeolite.

5. The fuel cell system according to claim 1, wherein the catalyst is a noble metal.

6. The fuel cell system according to claim 2, wherein the decomposition support portion includes an oxygen gas supply portion which supplies the odorant treatment portion with oxygen gas,
   the odorant treatment portion further includes a first flow path switching portion which selectively introduces the mixed gas and the oxygen gas into the odorant treatment portion, and
   the odorant treatment portion oxidizes and decomposes the adsorbed odorant by means of the oxygen gas supplied from the oxygen gas supply portion.

7. The fuel cell system according to claim 6, further comprising:
   a control portion which controls the odorant treatment portion,
   wherein
   the control portion controls the oxygen gas supply portion and the first flow path switching portion to supply the odorant treatment portion with the oxygen gas during a period in which an estimated amount of the odorant adsorbed by the odorant treatment portion is equal to or larger than a predetermined amount with operation of the fuel cell system being stopped.

8. The fuel cell system according to claim 6, further comprising:
   a post-decomposition gas passage through which post-decomposition gases discharged from the odorant treatment portion flow when the odorant treatment portion decomposes the adsorbed odorant; and
   a second flow path switching portion which introduces the hydrogen gas into the fuel cell if the hydrogen gas is discharged from the odorant treatment portion, and introduces the post-decomposition gases into the post-decomposition gas passage if the post-decomposition gases are discharged from the odorant treatment portion.

9. The fuel cell system according to claim 8, further comprising:
   a control portion which controls the odorant treatment portion,
   wherein
   the control portion controls the oxygen gas supply portion and the first flow path switching portion to supply the odorant treatment portion with the oxygen gas, and controls the second flow path switching portion to introduce the post-decomposition gases discharged from the odorant treatment portion into the post-decomposition gas passage during a period in which an estimated amount of the odorant adsorbed by the odorant treatment portion is equal to or larger than a predetermined amount with operation of the fuel cell system being stopped.

10. The fuel cell system according to claim 2, wherein the decomposition support portion includes a heating portion which heats the odorant treatment portion, and
    the odorant treatment portion reduces and decomposes the odorant adsorbed by the porous adsorbent while being heated by the heating portion, by means of hydrogen gas contained in the supplied mixed gas.

11. The fuel cell system according to claim 10, wherein the odorant treatment portion further includes a post-decomposition gas passage through which post-decomposition gases discharged from the odorant treatment portion flow during decomposition of the adsorbed odorant, and a flow path switching portion which introduces the hydrogen gas into the fuel cell if the hydrogen gas is discharged from the odorant treatment portion, and which introduces the post-decomposition gases into the post-decomposition gas passage if the post-decomposition gases are discharged from the odorant treatment portion.

12. The fuel cell system according to claim 11, further comprising:
a control portion which controls the odorant treatment portion,
wherein
the control portion controls the heating portion to heat the odorant treatment portion and controls the flow path switching portion to introduce the post-decomposition gases discharged from the odorant treatment portion into the post-decomposition gas passage during a period in which an estimated amount of the odorant adsorbed by the odorant treatment portion is equal to or larger than a predetermined amount with operation of the fuel cell system being stopped.

13. The fuel cell system according to claim 1, wherein the carrier has a roll structure or a honeycomb structure.

14. The fuel cell system according to claim 5, wherein the noble metal is Pt, Pd or Ru.

15. A hydrogen gas supply unit which supplies a predetermined apparatus with hydrogen gas, comprising:
an odorant treatment portion which treats an odorant in a mixed gas containing hydrogen gas and the odorant to obtain the hydrogen gas to supply to the predetermined apparatus, wherein the odorant treatment portion includes a carrier, wherein the carrier carries a porous adsorbent for adsorbing the odorant contained in the mixed gas and a catalyst for promoting decomposition of the odorant adsorbed by the porous adsorbent.

16. The hydrogen gas supply unit according to claim 15, wherein
the catalyst is a noble metal.

17. The hydrogen gas supply unit according to claim 16, wherein
the noble metal is Pt, Pd or Ru.

* * * * *